US010812860B2

United States Patent
Venugopal et al.

(10) Patent No.: US 10,812,860 B2
(45) Date of Patent: Oct. 20, 2020

(54) METHOD AND APPARATUS FOR RECORDING ADVERTISED MEDIA CONTENT

(71) Applicant: The DIRECTV Group, Inc., El Segundo, CA (US)

(72) Inventors: Megha Venugopal, Union City, CA (US); Steven Allstead, Jr., Long Beach, CA (US); Cory Max Bernhardt, Lomita, CA (US); Michael Habif, Lakewood, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 16/106,884

(22) Filed: Aug. 21, 2018

(65) Prior Publication Data

US 2018/0359526 A1    Dec. 13, 2018

Related U.S. Application Data

(62) Division of application No. 15/461,680, filed on Mar. 17, 2017, now Pat. No. 10,110,955.

(51) Int. Cl.
*H04N 7/16* (2011.01)
*H04N 21/458* (2011.01)
(Continued)

(52) U.S. Cl.
CPC ....... *H04N 21/458* (2013.01); *H04N 21/4147* (2013.01); *H04N 21/4334* (2013.01);
(Continued)

(58) Field of Classification Search
None
See application file for complete search history.

(56) References Cited

U.S. PATENT DOCUMENTS 5,880,720 A    3/1999 Iwafune et al.
6,177,931 B1   1/2001 Alexander
(Continued)

FOREIGN PATENT DOCUMENTS

EP    2265005 B1    8/2016
JP    3653672 B1    6/2005
(Continued)

OTHER PUBLICATIONS

"LG smart TV app offers popup reminders for program promotions", Electronista, macnn.com, Sep. 9, 2015.
(Continued)

*Primary Examiner* — William J Kim
(74) *Attorney, Agent, or Firm* — Guntin & Gust, PLC; Ralph Trementozzi

(57) ABSTRACT

Aspects of the subject disclosure may include, for example, obtaining social network information associated with a first user, wherein the social network information includes information identifying a second user who is related to the first user. A determination is made that the first user had selected, during a presentation of a first media content item by a first media processing device of the first user, recording of a second media content item that had been advertised during the presentation of the first media content item. Responsive to the determining that the first user had selected the recording of the second media content item, a second media processing device of the second user is directed to record the second media content item. Other embodiments are disclosed.

20 Claims, 11 Drawing Sheets

(51) Int. Cl.
*H04N 21/433* (2011.01)
*H04N 21/4147* (2011.01)
*H04N 21/81* (2011.01)
*H04N 21/4722* (2011.01)
*H04N 21/44* (2011.01)
*H04N 21/472* (2011.01)

(52) U.S. Cl.
CPC ... *H04N 21/44008* (2013.01); *H04N 21/4722* (2013.01); *H04N 21/47214* (2013.01); *H04N 21/812* (2013.01)

(56) References Cited

U.S. PATENT DOCUMENTS

| | | |
|---|---|---|
| 6,874,160 B1 | 3/2005 | Herz |
| 7,146,627 B1 | 12/2006 | Ismail et al. |
| 7,293,276 B2 | 11/2007 | Phillips et al. |
| 7,885,517 B2 | 2/2011 | Blackketter et al. |
| 7,908,618 B2 | 3/2011 | Bruckner et al. |
| 7,917,927 B1 | 3/2011 | Brown et al. |
| 8,079,048 B2 | 12/2011 | Howcroft et al. |
| 8,246,454 B2 | 8/2012 | Zalewski et al. |
| 8,315,384 B2 | 11/2012 | Tsunokawa et al. |
| 8,561,113 B2 | 10/2013 | Cansler, Jr. et al. |
| 8,607,267 B2 | 12/2013 | Shkedi et al. |
| 8,613,020 B2 | 12/2013 | Knudson et al. |
| 8,670,652 B2 | 3/2014 | Terasaki et al. |
| 9,152,300 B2 | 10/2015 | Poniatowski |
| 2003/0149988 A1 | 8/2003 | Ellis |
| 2003/0208758 A1 | 11/2003 | Schein et al. |
| 2004/0003405 A1 | 1/2004 | Boston et al. |
| 2005/0196139 A1 | 9/2005 | Blackketter et al. |
| 2006/0078277 A1* | 4/2006 | Miyazaki ............... H04N 7/163 386/213 |
| 2006/0206454 A1 | 9/2006 | Forstall et al. |
| 2006/0288365 A1* | 12/2006 | Jeong ................. H04N 5/44513 725/39 |
| 2008/0256218 A1* | 10/2008 | Kinoshita .......... H04N 7/17318 709/219 |
| 2009/0193460 A1 | 7/2009 | Barnett et al. |
| 2010/0329644 A1 | 12/2010 | Rosenfeld et al. |
| 2011/0126257 A1* | 5/2011 | Goergen ............ H04N 7/17318 725/132 |
| 2013/0073614 A1 | 3/2013 | Shine et al. |
| 2013/0073987 A1 | 3/2013 | Nush et al. |
| 2013/0111514 A1 | 5/2013 | Slavin et al. |
| 2014/0068654 A1* | 3/2014 | Marlow ............... H04N 21/235 725/28 |
| 2014/0282742 A1 | 9/2014 | Demsey et al. |
| 2015/0088622 A1 | 3/2015 | Ganschow |
| 2015/0229982 A1 | 8/2015 | Scott |
| 2015/0373398 A1 | 12/2015 | Kritt et al. |
| 2018/0270535 A1 | 9/2018 | Venugopal et al. |

FOREIGN PATENT DOCUMENTS

| | | |
|---|---|---|
| WO | 2004003693 A2 | 1/2004 |
| WO | 2013059902 A1 | 5/2013 |

OTHER PUBLICATIONS

"True [X] for Publishers", true [X], truex.com, Mar. 13, 2016.
Brancheau, Denise et al., "Interactive Television: A Primer", Media Magazine, Feb. 27, 2003, 7 pages.
Brown, Barry et al., "The television will be revolutionized: effects of PVRs and filesharing on television watching", Proceedings of the SIGCHI conference on Human Factors in Computing Systems, ACM, 2006.
Gold, Harry, "Interactive TV Ads: RealLife Examples", ClickZ, clickz.com, Jan. 19, 2010,.

* cited by examiner

200

270

300

350

METHOD AND APPARATUS FOR RECORDING ADVERTISED MEDIA CONTENT

CROSS-REFERENCE TO RELATED APPLICATIONS

This application is a divisional of U.S. patent application Ser. No. 15/461,680, filed Mar. 17, 2017, the disclosure of which is hereby incorporated herein by reference in its entirety.

FIELD OF THE DISCLOSURE

The subject disclosure relates to a method and apparatus for recording advertised media content.

BACKGROUND

Various systems for advertising media content and for recording media content have been provided.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for recording advertised media content. Other embodiments are described in the subject disclosure.

One or more aspects of the subject disclosure include mechanisms for allowing a user to set a recording for a program that is being advertised in a commercial. The program being advertised may be, e.g., a movie, a television show, a single episode of a television series, multiple episodes of a television series.

Figure 1A:
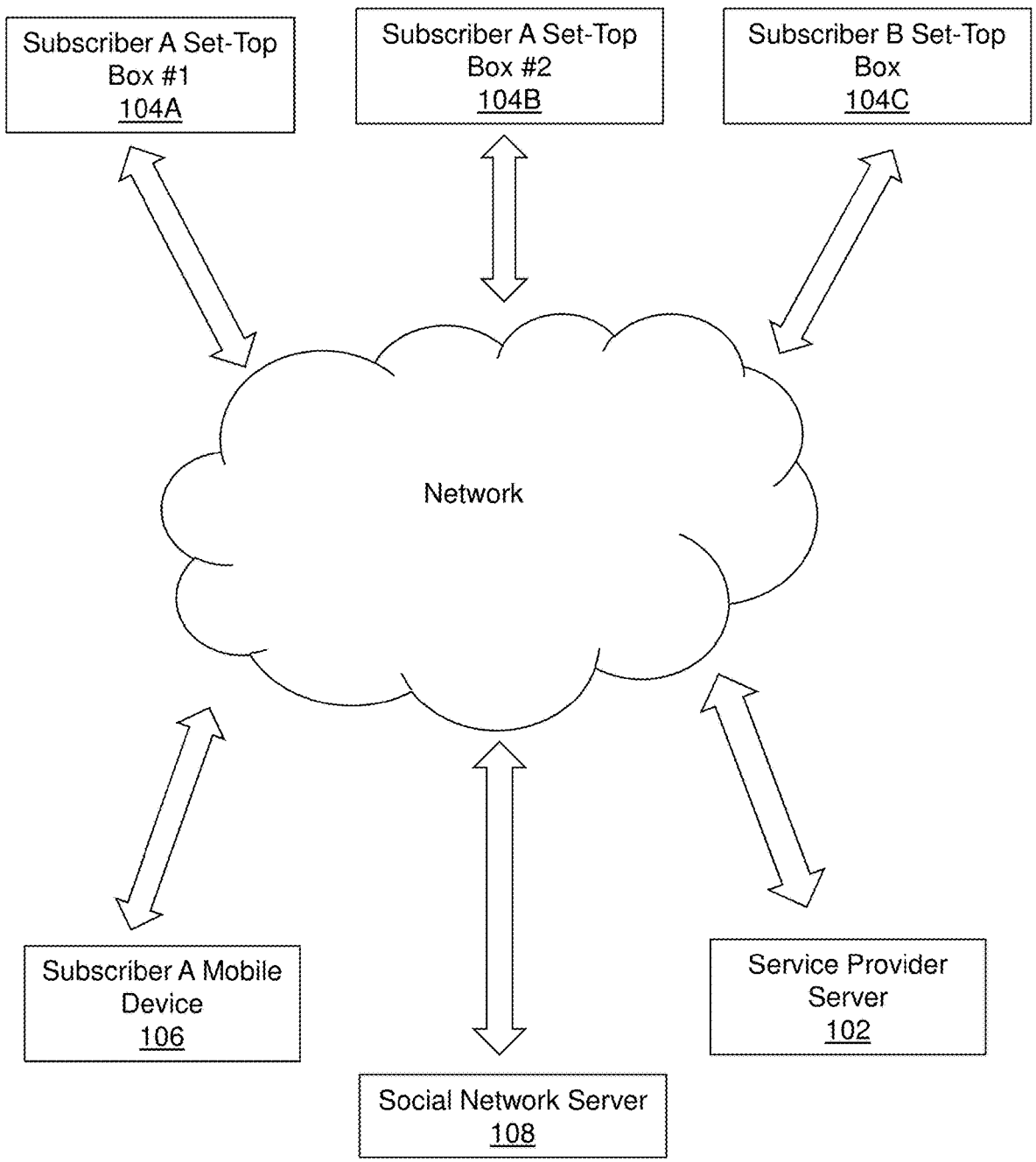
FIG. 1A depicts an illustrative embodiment of a system for recording advertised media content.

FIG. 1A depicts an illustrative embodiment of a system 100 for recording media content (e.g., advertised media content). As seen in this FIG., a service provider server 102 is in bi-directional communication via a network (e.g., the Internet) with Subscriber A set-top box #1 104A, Subscriber A set-top box #2 104B, Subscriber B set-top box 104C, Subscriber A mobile device 106 and social network server 108 (which may, for example, operate as (and/or form part of) a social media network). In one example, Subscriber A mobile device 104 may comprise a smartphone, a smart watch, a tablet, a laptop computer, or any combination thereof. In another example, Subscriber A set-top box #1 104A may be at a primary residence of Subscriber A and Subscriber A set-top box #2 104B may be at a secondary residence (e.g., vacation home) of Subscriber A. In another example, Subscriber A set-top box #1 104A may be in one room of a residence of Subscriber A (e.g. a living room) and Subscriber A set-top box #2 104B may be in a different room of the residence of Subscriber A (e.g., a bedroom). In another example, Subscriber B set-top box 104C may be at a residence of Subscriber B. In another example, the service provider server 102 may be operated by a service provider that provides (and/or facilitates provision of) media content to each of Subscriber A and Subscriber B. In one example, Subscriber A is a given person and Subscriber B is a different person who is a friend or family of (or otherwise related to) Subscriber A. In another example, each of Subscriber A and Subscriber B may subscribe to services of the same service provider.

Subscriber A (not shown) may use a set-top box (e.g., Subscriber A set-top box #1 104A or Subscriber A set-top box #2 104B) to perform various registration functions. Such registration functions may be carried out, for example, via a graphical user interface presented by the set-top box on a display (such as a television).

In one example, Subscriber A may use the set-top box to register Subscriber A mobile device 106 with service provider server 102. Such registration may comprise, for example, storage of identification information associated with Subscriber A mobile device 106 (e.g., telephone number, account number, serial number). The identification information may be stored in one or more databases (not shown) accessible by service provider server 102. The identification information may be stored in one or more user profiles (not shown) accessible by service provider server 102. The identification information may cause service provider server 102 to associate Subscriber A mobile device 106 with Subscriber A set-top box #1 104A, Subscriber A set-top box #2 104B and/or Subscriber B set-top box 104C.

In another example, Subscriber A may use the set-top box to register each of Subscriber A set-top box #1 104A and Subscriber A set-top box #2 104B with service provider server 102. Such registration may comprise, for example, storage of identification information associated with Subscriber A set-top box #1 104A (e.g., Subscriber A's name, Subscriber A's account number with the service provider, a serial number of Subscriber A set-top box #1 104A) and identification information associated with Subscriber A set-top box #2 104B (e.g., Subscriber A's name, Subscriber A's account number with the service provider, a serial number of Subscriber A set-top box #2 104B). The identification information may be stored in one or more databases (not shown) accessible by service provider server 102. The identification information may be stored in one or more user profiles (not shown) accessible by service provider server 102. The identification information may cause service provider server 102 to associate Subscriber A set-top box #1 104A with Subscriber A mobile device 106, Subscriber A set-top box #2 104B and/or Subscriber B set-top box 104C. The identification information may cause service provider server 102 to associate Subscriber A set-top box #2 104B with Subscriber A mobile device 106, Subscriber A set-top box #1 104A and/or Subscriber B set-top box 104C.

In another example, Subscriber A may register Subscriber B set-top box 104C with service provider server 102. Such registration may comprise, for example, storage of identification information associated with Subscriber B set-top box 104C (e.g., Subscriber B's name, Subscriber B's account number with the service provider, a serial number of Subscriber B set-top box 104C). The identification information may be stored in one or more databases (not shown) accessible by service provider server 102. The identification information may be stored in one or more user profiles (not shown) accessible by service provider server 102. The identification information may cause service provider server 102 to associate Subscriber B set-top box 104C with Subscriber A mobile device 106, Subscriber A set-top box #1 104A and/or Subscriber A set-top box #2 104B.

Subscriber B (not shown) may use a set-top box (e.g., Subscriber B set-top box 104C) to perform various registration functions. Such registration functions may be carried out, for example, via a graphical user interface presented by the set-top box on a display (such as a television).

In one example, Subscriber B may use subscriber B set-top box 104C to register (e.g., via a graphical user interface) Subscriber B set-top box 104C with service provider server 102. Such registration may comprise, for example, storage of identification information associated with Subscriber B set-top box 104C (e.g., Subscriber B's name, Subscriber B's account number with the service provider, a serial number of Subscriber B set-top box 104C). The identification information may be stored in one or more databases (not shown) accessible by service provider server 102. The identification information may be stored in one or more user profiles (not shown) accessible by service provider server 102. The identification information may cause service provider server 102 to associate Subscriber B set-top box 104C with Subscriber A mobile device 106, Subscriber A set-top box #1 104A and/or Subscriber A set-top box #2 104B.

In another example, Subscriber B may register (e.g., via a graphical user interface) Subscriber A set-top box #1 104A and/or Subscriber A set-top box #2 104B with service provider server 102. Such registration may comprise, for example, storage of identification information associated with Subscriber A set-top box #1 104A (e.g., Subscriber A's name, Subscriber A's account number with the service provider, a serial number of Subscriber A set-top box #1 104A) and/or identification information associated with Subscriber A set-top box #2 104B (e.g., Subscriber A's name, Subscriber A's account number with the service provider, a serial number of Subscriber A set-top box #2 104B). The identification information may be stored in one or more databases (not shown) accessible by service provider server 102. The identification information may be stored in one or more user profiles (not shown) accessible by service provider server 102. The identification information may cause service provider server 102 to associate Subscriber A set-top box #1 104A and/or Subscriber A set-top box #2 104B with Subscriber B set-top box 104C.

In another example, Subscriber B may register (e.g., via a graphical user interface) Subscriber A mobile device 106 with service provider server 102. Such registration may comprise, for example, storage of identification information associated with Subscriber A mobile device 106 (e.g., telephone number, account number, serial number). The identification information may be stored in one or more databases (not shown) accessible by service provider server 102. The identification information may be stored in one or more user profiles (not shown) accessible by service provider server 102. The identification information may cause service provider server 102 to associate Subscriber A mobile device 106 with Subscriber B set-top box 104C, Subscriber A set-top box #1 104A, and/or Subscriber A set-top box #2 104B.

Still referring to FIG. 1A, Subscriber A (not shown) may use a mobile device (e.g., Subscriber A mobile device 106) to perform various registration functions (e.g., to perform any of the registration functions described herein). Such registration functions may be carried out, for example, via a graphical user interface presented by the mobile device on a display thereof.

Still referring to FIG. 1A, each of service provider server 102, Subscriber A set-top box #1 104A, Subscriber A set-top box #2 104B, Subscriber B set-top box 104C, Subscriber A mobile device 106 and/or social network server 108 may be used as described herein to enable various media content steaming, downloading and/or recording. For example, Subscriber A may utilize Subscriber A set-top box #1 104A (e.g., in connection with service provider server 102) to direct recording (e.g., at Subscriber A set-top box #1 104A) of an advertised media content. In another example, Subscriber A may utilize Subscriber A mobile device 106 (e.g., in connection with service provider server 102) to direct recording (e.g., at a selected one of Subscriber A set-top box #1 104A or Subscriber B set-top box #2 104B) of an advertised media content. In another example, Subscriber A may utilize Subscriber A set-top box #1 104A (e.g., in connection with service provider server 102) to direct recording (e.g., at Subscriber A set-top box #1 104A) of an advertised media content, wherein recording of the same advertised media content is also directed (e.g., by service provider server 102) at Subscriber B set-top box 104C.

Figure 1B:
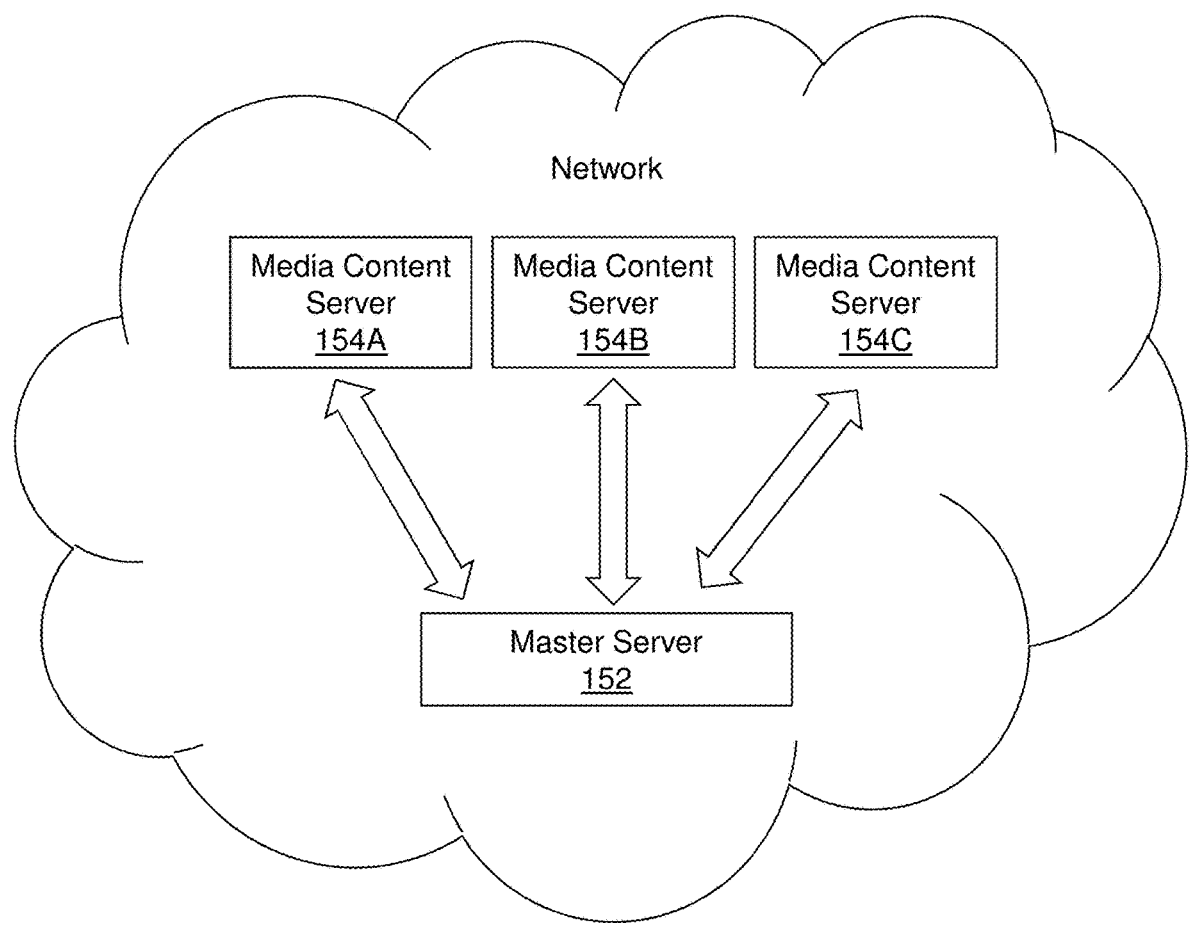
FIG. 1B depicts an illustrative embodiment of a system for recording advertised media content.

Referring now to FIG. 1B, this FIG. depicts an illustrative embodiment of a system 150 for providing access (e.g., streaming access and/or downloadable access) to media content. As seen, master server 152 is in bidirectional communication (through the network) with media content server 154A, media content server 154B and media content server 154C. While three media content servers are shown in this example, any desired number of media content servers may be used. Master server 152 may cause or direct any of media content servers 154A, 154B and/or 154C to provide media content (e.g., provide media content to Subscriber A set-top box #1 104A and/or Subscriber B set-top box #2 104C.

Figure 2A:
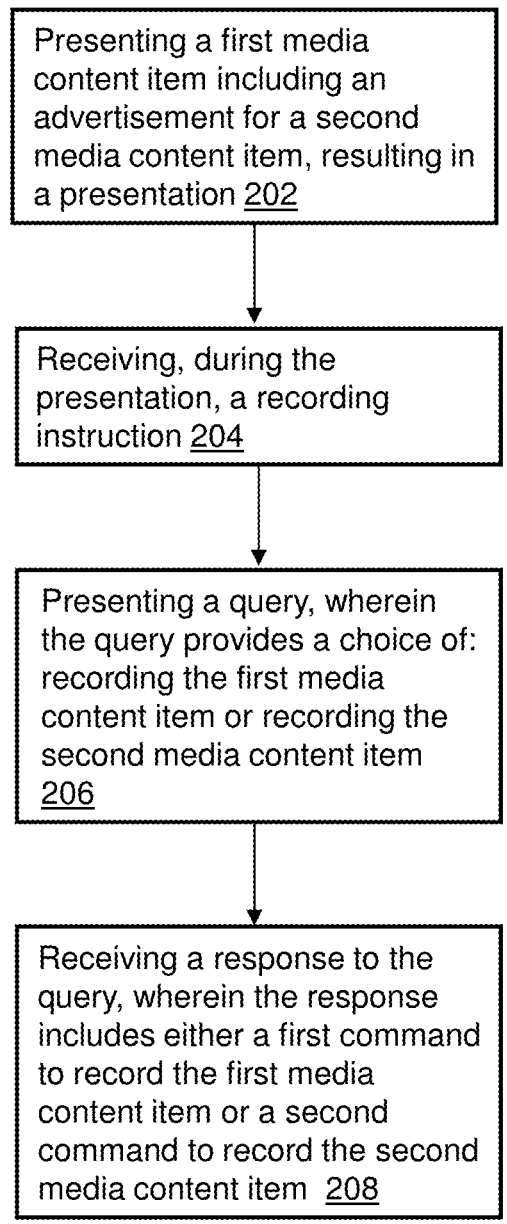
FIG. 2A depicts an illustrative embodiment of a method used in portions of the systems described in FIGS. 1A and 1B.

FIG. 2A depicts an illustrative embodiment of a method used by system 100 of FIG. 1A and/or system 150 of FIG. 1B. While for purposes of simplicity of explanation, the respective processes are shown and described as a series of blocks in FIG. 2A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 2A, method 200 begins at step 202 with presenting a first media content item including an advertisement for a second media content item, resulting in a presentation. In one example, the presentation is provided via a display (e.g., a television). In another example, the display is in operative communication with a set-top box of the user (see, e.g., Subscriber A set-top box #1 104A). In another example, the set-top box may receive the presentation (e.g., in the form of the first media content along with the advertisement) from a service provider server (see, e.g., service provider server 102) and/or from a media server (see, e.g., media content servers 154A-154C).

Method 200 then continues to step 204 with receiving, during the presentation, a recording instruction. In one example, the recording instruction is provided from the user via input to a remote control device by the user. In another example, the remote control device provides the recording instruction to the set-top box (e.g., the set-top box via which the presentation is made).

Method 200 then continues to step 206 with presenting a query. In one example, the query is presented responsive to receiving the recording instruction during presentation of the advertisement. In another example, the query provides a choice of: (a) recording the first media content item; or (b) recording the second media content item. In another example, the query is provided to the user via a graphical user interface shown on the display (e.g., the display in operative communication with the set-top box of the user).

Method 200 then continues to step 208 with receiving a response to the query. In one example, the response includes either a first command to record the first media content item or a second command to record the second media content item (that is, the media content advertised during the presentation). In one example, the response is provided from the user via the graphical user interface shown on the display. In another example, the response is provided from the user via input to the remote control device by the user. In another example, the remote control device provides the response to the set-top box.

In one example, following step 208, one or more of the following steps may then be performed: (a) making a current recording of the first media content item (in a case that the response included the first command to record the first media content item); (b) making a current recording of the second media content item (in a case that the response included the second command to record the second media content item); (c) scheduling a future recording of the first media content item (in a case that the response included the first command to record the first media content item); and/or (d) scheduling a future recording of the second media content item (in a case that the response included the second command to record the second media content item). In one specific example, the response may include an indication of: (a) whether the recording should be made essentially immediately (that is, a current recording); and/or (b) whether the recording should be a future recording (that is, a recording scheduled for a future time).

Figure 2B:
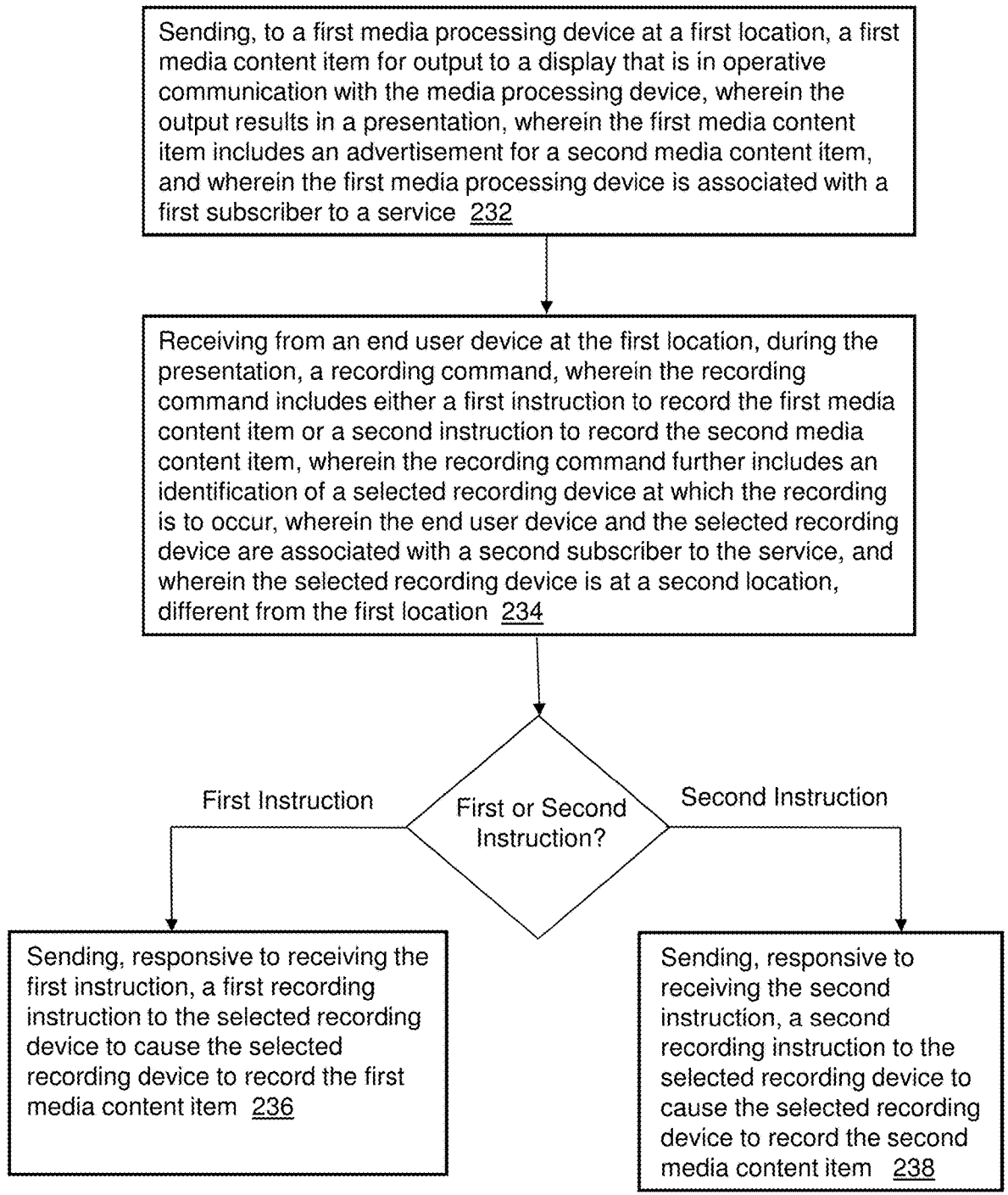
FIG. 2B depicts an illustrative embodiment of a method used in portions of the systems described in FIGS. 1A and 1B.

FIG. 2B depicts an illustrative embodiment of a method used by system 100 of FIG. 1A and/or system 150 of FIG. 1B. While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 2B, method 230 begins at step 232 with sending, to a first media processing device at a first location (e.g., a first premises), a first media content item for output to a display that is in operative communication with the first media processing device. In one example, the output results in a presentation. In another example, the first media content item includes an advertisement for a second media content item. In another example, the first media processing device is associated with a first subscriber to a service (e.g. a media service). In another example, the first media processing device is a set-top box (see, e.g., subscriber B set-top box 104C). In another example, the display is a television. In another example, the first media processing device may receive the presentation (e.g., in the form of the first media content item along with the advertisement) from a service provider server (see, e.g., service provider server 102) and/or from a media server (see, e.g., media content servers 154A-154C).

Method 230 then continues to step 234 with receiving from an end user device at the first location (see, e.g., subscriber A mobile device 106), during the presentation, a recording command. In one example, the recording command includes either a first instruction (a first instruction from the end user device) to record the first media content item or a second instruction (a second instruction from the end user device) to record the second media content item. In another example, the recording command further includes an identification of a selected recording device (see, e.g., subscriber A set-top box #1 104A) at which recording is to occur. In another example, the end user device and the selected recording device are associated with a second subscriber to the service (wherein the first subscriber is distinct from the second subscriber). In another example, the recording command is provided from the end user device in response to input (by the second subscriber) to a graphical user interface of the end user device. In another example, the end user device provides the recording command to a service provider server (see, e.g., service provider server 102). In another example, the selected recording device is at a second location (e.g., a premises) different from the first location.

Method 230 then continues to step 236 (in a case that the recording command included the first instruction to record the first media content item) with sending a first recording instruction to the selected recording device to cause the selected recording device to record the first media content item. In one example, the first recording instruction is sent by the service provider server to the selected recording device.

In the alternative, method 230 continues to step 238 (in a case that the recording command included the second instruction to record the second media content item) with sending a second recording instruction to the selected recording device to cause the selected recording device to record the second media content item. In one example, the second recording instruction is sent by the service provider server to the selected recording device.

In one example, following step 236 or step 238, one or more of the following steps may then be performed: (a) making a current recording of the first media content item (in a case that the recording command included the first instruction to record the first media content item); (b) making a current recording of the second media content item (in a case that the recording command included the second instruction to record the second media content item); (c) scheduling a future recording of the first media content item (in a case that the recording command included the first instruction to record the first media content item); and/or (d) scheduling a future recording of the second media content item (in a case that the recording command included the second instruction to record the second media content item). In one specific example, the recording command may include an indication of: (a) whether the recording should be made essentially immediately (that is, a current recording); and/or (b) whether the recording should be a future recording (that is, a recording scheduled for a future time).

In another example, after receiving the recording command, a determination can be made as to whether the recording command had included the first instruction or the second instruction. Then, the sending of the first recording instruction or the sending of the second recording instruction can be performed responsive to such determination.

In another embodiment, the set-top box presenting the advertisement (see, e.g., subscriber B set-top box 104C) communicates with the selected recording device (e.g. subscriber A set-top box #1 104A and/or its associated digital video recorder) to coordinate the recording by subscriber A set-top box #1 104A and/or its associated digital video recorder.

Figure 2C:
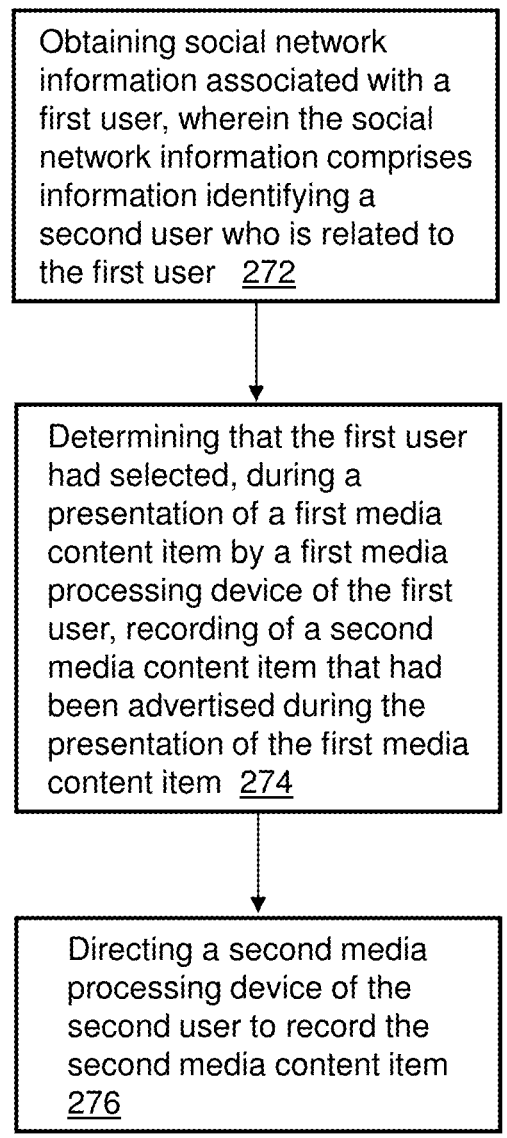
FIG. 2C depicts an illustrative embodiment of a method used in portions of the systems described in FIGS. 1A and 1B.

FIG. 2C depicts an illustrative embodiment of a method used by system 100 of FIG. 1A and/or system 150 of FIG. 1B. While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 2C, method 270 begins at step 272 with obtaining social network information associated with a first user. In one example, the social network information may be obtained from a social network server (see, e.g., social network server 108). In another example, the social network information may be obtained from a social network server by a service provider server (see, e.g., service provider server 102). In another example, the social network information may be obtained from a social network server in response to a request (e.g., from the service provider server). In another example, the social network information may comprise information identifying a second user who is related to the first user (e.g., related in the social network as a family member, a friend, or another type of relationship).

Method 270 then continues to step 274 with determining that the first user had selected recording of a second media content item that had been advertised during a presentation of a first media content item. In one example, the first user had made the selection during a presentation (e.g., on a display device such as a television) of the first media content item by a first media processing device of the first user (see, e.g., subscriber A set-set top box #1 104A). In another example, a service provider server (see, e.g., service provider server 102) determines that the first user had selected recording of the second media content item that had been advertised during the presentation of the first media content item.

Method 270 then continues to step 276 with directing a second media processing device (see, e.g., subscriber B set-top box 104C) of the second user to record the second media content item. In one example, the directing the second media processing device to record the second media content item is responsive to the determining that the first user had selected recording of the second media content item. In another example, a service provider server (see, e.g., service provider server 102) directs the second media processing device to record the second media content item (e.g., responsive to the service provider server determining that the first user had selected recording of the second media content).

In one example, following step 276, one or more of the following steps may then be performed: (a) making a current recording of the second media content item; or (b) scheduling a future recording of the second media content item. In one specific example, the directing of the recording may include an indication of: (a) whether the recording should be made essentially immediately (that is, a current recording); and/or (b) whether the recording should be a future recording (that is, a recording scheduled for a future time).

In another embodiment, the directing by the processing system (responsive to the determining that the first user had selected recording of the second media content item) the second media processing device of the second user to record the second media content item may be automatically directing.

In another embodiment, the directing by the processing system (responsive to the determining that the first user had selected recording of the second media content item) the second media processing device of the second user to record the second media content item may be performed without user interaction (e.g., without interaction of the first user and without interaction of the second user).

In another embodiment, the method may further comprise: responsive to the determining that the first user had selected recording of the second media content item, requesting by the processing system (e.g., automatically requesting) a recording confirmation; receiving by the processing system the recording confirmation; and responsive to the receiving the recording conformation, directing by the processing system the second media processing device of the second user to record the second media content item. In one example, the requesting may comprise requesting from the first user (such as requesting via a first user device) and/or requesting from the second user (such as requesting via a second user device). In another example, the receiving may comprise receiving from the first user (such as receiving via a first user device) and/or receiving from the second user (such as receiving via a second user device).

Figure 3A:
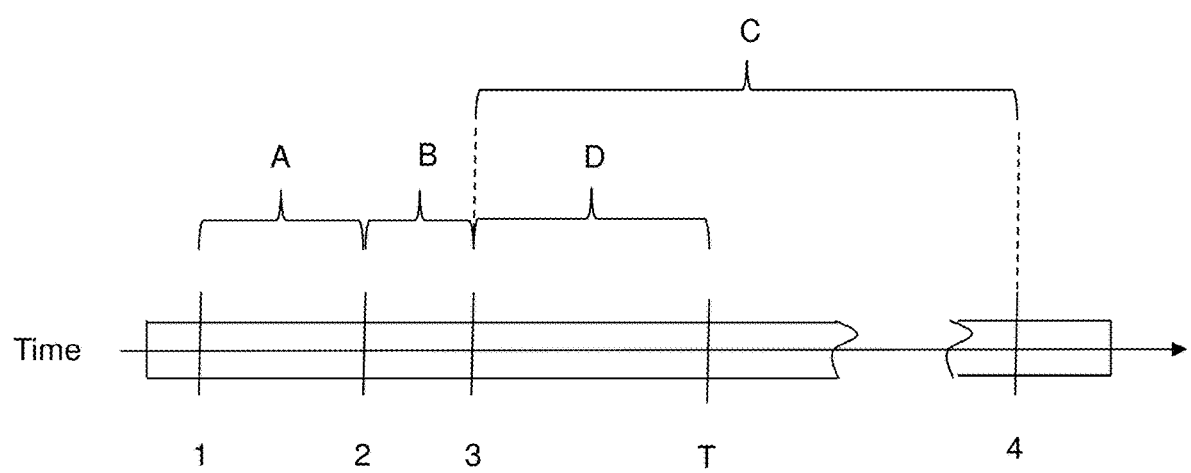
FIG. 3A depicts an example of a presentation timeline.

FIG. 3A depicts an example of a presentation timeline. In this example, a presentation (including a first media content item and an advertisement for a second media content item) begins at point 1 and ends at point 4. The first media content item includes segment A (between points 1 and 2) and segment C (between points 3 and 4). The presentation further includes an advertisement (for the second media content item) at segment B (between points 2 and 3).

In one embodiment, a query (as to whether a user wishes to record the first media content item or the advertised second media content item) may be presented during segment B. In this embodiment, after the end of segment B at point 3 the query would no longer be presented and a recording command from the user would directly result in making a current recording of the first media content item and/or scheduling a future recording of the first media content item.

In another embodiment, a query (as to whether a user wishes to record the first media content item or the advertised second media content item) may be presented during segments B+C (that is, at any time after the beginning of the advertisement at point 2 to the end of the presentation at point 4).

In another embodiment, a query (as to whether a user wishes to record the first media content item or the advertised second media content item) may be presented during segments B+D (that is, at any time after the beginning of the advertisement at point 2 to the beginning of a threshold time at point T). In this embodiment, after the end of segment D at point T the query would no longer be presented and a recording command from the user would directly result in making a current recording of the first media content item and/or scheduling a future recording of the first media content item. In one example, the span of time between the end of the advertisement at point 3 to the threshold point T may be set by the user (e.g., set by the user and stored in a profile). In another example, the span of time between the end of the advertisement at point 3 to the threshold point T may be a default set by the service provider (e.g., via the service provider server).

Figure 3B:
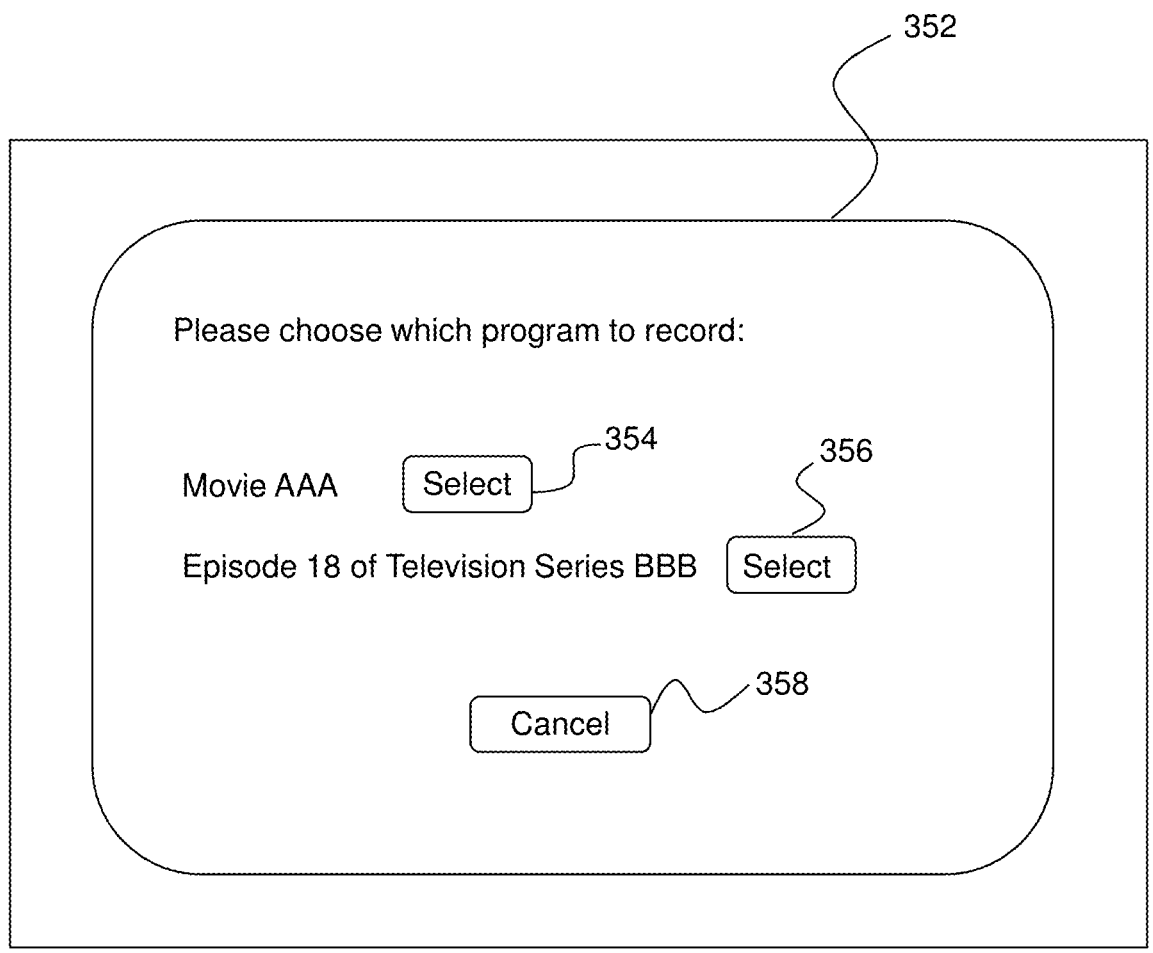
FIG. 3B depicts an illustrative embodiment of a graphical user interface.

FIG. 3B depicts an illustrative embodiment of a graphical user interface 350. In one example, the graphical user interface may be presented on a display (e.g., a television) in operative communication with a set-top box (see, e.g., subscriber A set-top box #1 104A). The graphical user interface 350 may include query screen 352, upon which a query (such as described herein) is presented. As seen, query screen 352 is asking (in this example) whether the user wants to record the media content currently being presented (shown here as "Movie AAA") or whether the user wants to record the media content being advertised (shown here as "Episode 18 of Television Series BBB"). A user interface element 354 (e.g., a GUI button) may be actuated to record "Movie AAA" or user interface element 356 (e.g., a GUI button) may be actuated to record "Episode 18 of Television Series BBB"). Further, user interface element 358 (e.g., a GUI button) may be actuated to cancel the operation and make no recording.

Figure 3C:
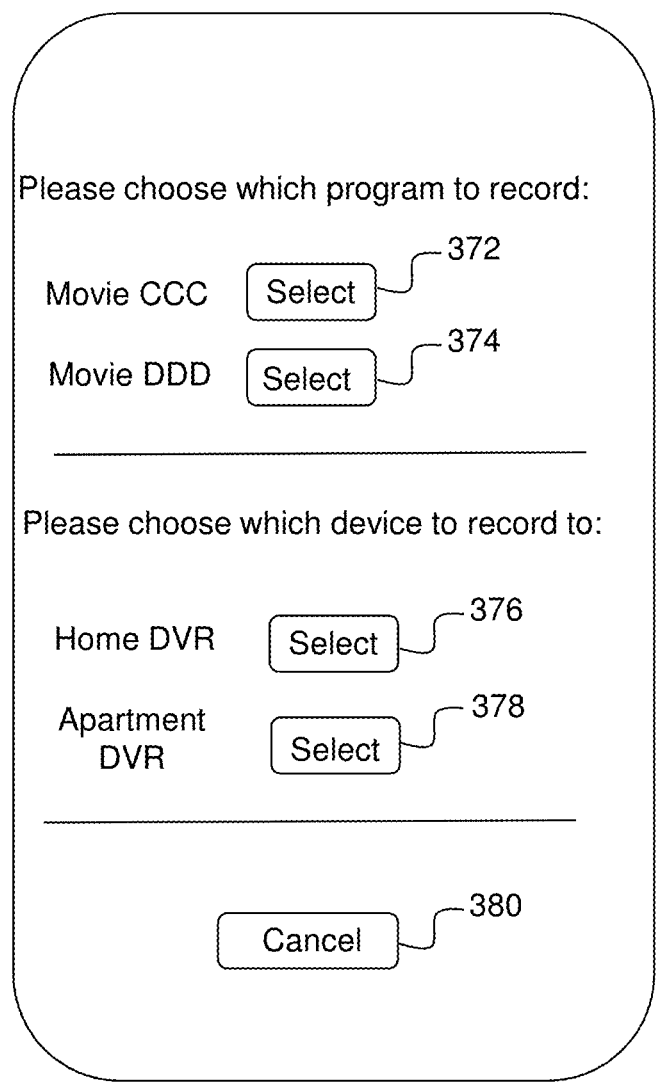
FIG. 3C depicts an illustrative embodiment of a graphical user interface.

FIG. 3C depicts an illustrative embodiment of a graphical user interface 370. In one example, the graphical user interface 370 may be presented on a mobile device, such as a smartphone (see, e.g., Subscriber A mobile device 106 of FIG. 1A). The graphical user interface 370 may include a query screen upon which a query (such as described herein) is presented. As seen, the example query is asking whether the user wants to record the media content currently being presented (shown here as "Movie CCC") or whether the user wants to record the media content being advertised (shown here as "Movie DDD"). In one example, the media content currently being presented (and the advertisement for the advertised media content) are being shown on a display in operative communication with a set-top box of a person other than subscriber A. In one specific example, the media content currently being presented (and the advertisement for the advertised media content) are being shown on a display in operative communication with Subscriber B set-top box 104C of FIG. 1A. In another specific example, the media content currently being presented (and the advertisement for the advertised media content) are being shown on a display in operative communication with a set-top box at a residence of subscriber B. In another specific example, subscriber B may be a friend, a relative and/or a business acquaintance of subscriber A.

Still referring to FIG. 3C, a user interface element 372 (e.g., a GUI button) may be actuated to record "Movie CCC" or user interface element 374 (e.g., a GUI button) may be actuated to record "Movie DDD"). In another specific example, the media content currently being presented (and the advertisement for the advertised media content) are being shown on a display in operative communication with a set-top box that had previously been associated with the mobile device. In another specific example, the association is stored in a user profile or the like.

Still referring to FIG. 3C, the query (in this example) is also asking whether the user wants to record the selected media content on the user's home digital video recorder (DVR) or on the user's apartment digital video recorder (DVR). In one specific example, the user's home digital video recorder is in operative communication with Subscriber A set-top box #1 104A of FIG. 1A and the user's apartment digital video recorder is in operative communication with Subscriber A set-top box #2 104B of FIG. 1A. In another specific example, the query could ask whether the user wants to record the selected media content on the user's living room digital video recorder (DVR) or on the user's bedroom digital video recorder (DVR).

A user interface element 376 (e.g., a GUI button) may be actuated to record at "Home DVR" or user interface element 378 (e.g., a GUI button) may be actuated to record at "Apartment DVR". Further, user interface element 380 (e.g., a GUI button) may be actuated to cancel the operation and make no recording.

In another specific example, the list of target recording devices may be based upon candidate devices that had previously been associated (e.g., via registration) with the mobile device. In another specific example, the association is stored in a user profile or the like.

As described herein, various embodiments provide mechanisms for allowing a user to set a recording for a program that is being advertised in a commercial. The program being advertised may be, e.g., a movie, a television show, a single episode of a television series, multiple episodes of a television series.

For example, a user is watching an episode of "Series A". A commercial is presented for "Series B". The user is given a graphical user interface that provides one-touch setting of a recording command to record "Series B" (the advertised program) when it airs.

In one embodiment, the graphical user interface may present to the user collateral information when the user is provided with the option to record "Series B". The collateral information may include suggestions for other programming ("you might like . . . "), and/or data indicating how many other people matching the user's demographics have recorded "Series B".

In another embodiment, a commercial may be "pushed" to people in a social network (e.g., social media network) of the user. For example, in response to the user electing to make a recording of "Series B" based upon a commercial for "Series B" airing during "Series A," that commercial (for "Series B") may then be provided to people in a social network of the user (in one example, the commercial may be provided to the people in the social network of the user when they are watching television at another time).

In another example, in response to the user electing to make a recording of "Series B" based upon a commercial for "Series B" airing during "Series A," an automatic scheduling for recording "Series B" for people in the social network of the user may occur.

In another example, behavioral profile(s) may be obtained for the user and/or for people in the social network of the user. In this example, in response to the user electing to make a recording of "Series B" based upon a commercial for "Series B" airing during "Series A," an automatic scheduling for recording "Series B" for people in the social network of the user may occur for those people whose behavioral profile(s) indicate that they would enjoy watching "Series B".

In one embodiment, the service provider may provide (such as via one or more servers) the presentation (including the program being watched and the advertisement), wherein the service provider thus has knowledge of what program is being advertised at any given time.

In one example, a presentation may include a program being watched along with multiple different advertisements (e.g., for multiple different programs).

In another embodiment, a program being advertised may be determined from metadata (e.g., in the advertisement) and/or from an analysis of the advertisement (e.g., audio and/or image analysis).

In another embodiment, a query can be pushed to a user during an advertisement (that is, sent to the user without prompting by the user).

In another embodiment, recorded data (e.g., recorded media content) may be stored on the cloud (e.g., by the service provider server and/or one or more other servers).

In another embodiment, user input may be provided via voice commands.

In another embodiment, one or more viewing recommendations (e.g., for advertised programs) may be pushed to one or more social network friends, family members, work acquaintances, etc. (e.g., pushed to people in the social network who have the same likes and/or dislikes).

In another embodiment, future scheduling for a program may be configured so that a given program is viewed and/or recorded by multiple people (e.g. people related in a social network) at substantially the same time.

In another embodiment, a query that is presented to a user may include information to aid the user in making a decision. For example, the query may include regional demographic information. In one specific example, the regional demographic information may be obtained by the service provider. In another specific example, the regional demographic information may indicate how many other people in the same age group as the user have recorded the advertised program (e.g., "this number of teenagers in your high school have recoded this program").

In another embodiment, one or more behavioral profiles of a group of people (e.g., people in a social network) may be used (e.g., by the service provider server) to automatically record a particular advertised program.

As described herein are mechanisms to enable setting a recording from a commercial. Various embodiments allow a user to set one or more recordings for a program (e.g., show/movie/sporting event/concert) from a commercial that is being aired on a channel. In one example, the user does not need to search for the program in his or her guide (e.g., electronic program guide) in order to set the recording. Rather, the disclosed mechanisms may allow the user to set (e.g., one-touch set) recordings of content shown in a commercial playing on, for example, a set-top box (STB) or mobile device of the user. Thus, in various embodiments, the user no longer has to remember or search for the programs that they have seen in commercials (instead, the user may, for example, simply press a button while the commercial is playing, and the associated recording is set up).

As described herein, in various embodiments there is an increase in the ease of setting recordings of programs that are advertised. Such embodiments may thus leverage certain impulsive buying/recording characteristics of the user.

As described herein, in various embodiments if the user presses the record button during a commercial for content, the user will be prompted to select which program they are requesting to record (the currently airing program, or the program associated with the commercial). In one example, once that selection is made, the user would continue through the normal set recording flow As described herein, in various embodiments the service provider knows what commercial a user is viewing when the record button is pressed. In one specific example, the service provider may know this because the service provider may be the entity that inserts the commercial into the currently viewed program. In another specific example, the service provider may know this because the currently viewed program is a video on demand program.

As described herein, in various embodiments mechanisms for enabling the following example process may be provided: (1) The user is watching a live channel and there is a commercial of a new TV series or a movie that the user wishes to record; (2) The user actuates the record button while the commercial is being aired; (3) The set-top box (STB) software checks its tuner feed for the channel to understand if the user actuated the record button when the commercial was being aired or not. The STB prompts the user to confirm if the user wishes to record the ongoing program or the program from the commercial; (4) If the user actuated the record button during the commercial, the STB software checks when would the requested program be aired (e.g., within a specified timeframe such as within the next 7 days, the next 14 days, or the next 30 days) and then sets the recording for the program and notifies the user; (5) If the requested program is not available (e.g., not available during the specified timeframe), the STB software looks for this content in a video on demand (VOD) database and checks with the user if the user wishes to purchase a VOD for the requested program (if the user wishes, the purchase may then be made); and/or (6) If the user had actuated the record button for an ongoing program and not a commercial then the recording is set for the ongoing program.

In another example, the mobile device may communicate with the service provider server and/or one or more set-top boxes to implement the techniques described herein.

In another example, the mobile device may communicate with the service provider server via a network connection. In another example, the mobile device may communicate with a set-top box via a short-range communication mechanism. In another example, a set-top box may communicate with the service provider server via a network connection. In another example, a first set-top box may communicate with a second set-top box via a network connection. In another example, a first set-top box may communicate with a second set-top box via a network connection using the service provider server as an intermediary.

In another example, a mobile device may direct a first set-top box to coordinate with a second set-top box to cause a recording by the second set-top box (e.g., a recording by the second set-top box using a digital video recorder associated therewith).

In another example, a digital video recorder used as described herein may be a local digital video recorder (e.g., serving one set-top box and/or one display) and/or a networked digital video recorder (e.g., serving a plurality of set-top boxes and/or a plurality of displays).

In another example, the set-top box (e.g., the set-top box via which the current program is being shown) determines which program is being advertised in the commercial (e.g., by identifying the commercial from a database of commercials).

In another example, when the user is presented with a query as to which program to record, the user may also be presented with an option to record the selected program in standard definition (SD) or in high definition (HD). A recording in the selected format (e.g., SD or HD) would then be made as described herein.

In another example (in a case that the advertised program is an episode of a series), when the user is presented with a query as to which program to record, the user may also be presented with an option to record the single episode of the advertisement or to record one or more episodes of the series (e.g., all episodes in the current season, all episodes in the entire series, a certain number of previous episodes in the current season, a certain number of previous episodes in the entire series, a certain number of future episodes in the current season, a certain number of future episodes in the entire series, all episodes from the beginning of the current season up until the current episode, all episodes from the beginning of the entire series up until the current episode, all episodes from the current episode up until the end of the current season, and/or all episodes from the current episode up until the end of the entire series).

Figure 4:
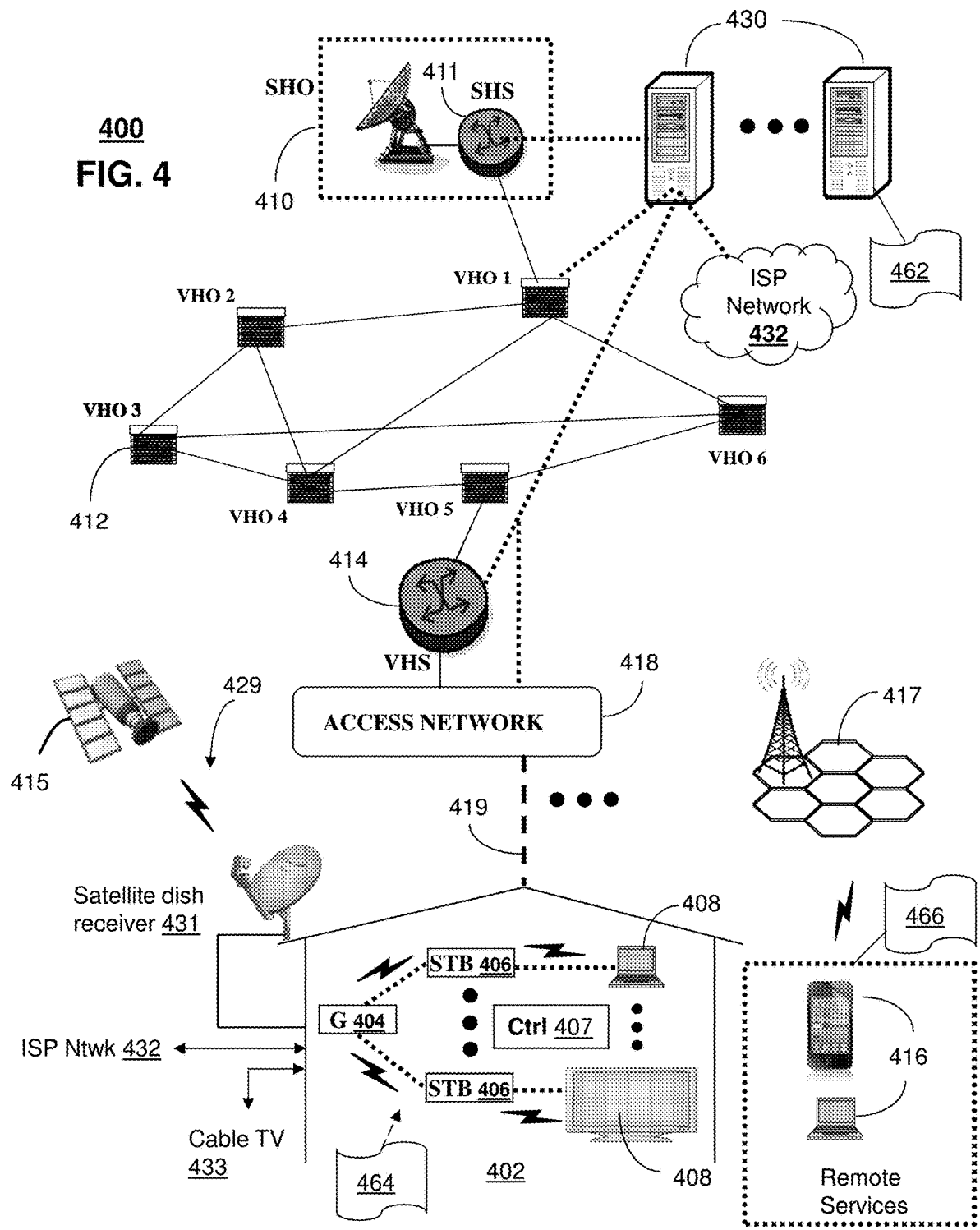
FIG. 4 depicts an illustrative embodiment of communication systems that provide media services including recording advertised media content as described in connection with the embodiments of FIGS. 1A-1B and 2A-2C.

FIG. 4 depicts an illustrative embodiment of a communication system 400 for providing various communication services, such as recording media content (e.g., advertised media content). The communication system 400 can represent an interactive media network, such as an interactive television system (e.g., an Internet Protocol Television (IPTV) media system). Communication system 400 can be overlaid or operably coupled with system 100 of FIG. 1A and/or system 150 of FIG. 1B as another representative embodiment of communication system 400. For instance, one or more devices illustrated in the communication system 400 of FIG. 4 can function as the service provider server, the master server and/or the media content server(s) for recording media content (e.g., advertised media content). In another example, one or more devices illustrated in the communication system 400 of FIG. 4 can function as one or more set-top boxes (and/or one or more associated digital video recorders). In another example, one or more devices illustrated in the communication system 400 of FIG. 4 can function as one or more social network server(s).

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416. Such a web server can operate as and/or provide the functions of service provider server 102 of FIG. 1A and/or social network server 108 of FIG. 1A. Further, such a web server can operate as and/or provide the functions of master server 152 of FIG. 1B and/or one or more of media content servers 154A, 154B and/or 154C of FIG. 1B.

Communication system 400 can also provide for all or a portion of the computing devices 430 to function as a service provider server (herein referred to as service provider server 430). The service provider server 430 can use computing and communication technology to perform function 462, which can include among other things, the media content recording techniques described by method 200 of FIG. 2A, method 230 of FIG. 2B and/or method 270 of FIG. 2C. For instance, function 462 of server 430 can be similar to the functions described for servers 102, 108, 152, 154A, 154B and/or 154C of FIGS. 1A and 1B in accordance with methods 200, 230 and/or 270. The media processors 406 and wireless communication devices 416 can be provisioned with software functions 464 and 466, respectively, to utilize the services of service provider server 430. For instance, functions 464 and 466 of media processors 406 and wireless communication devices 416 can be similar to the functions described for the communication devices 104A, 104B, 104C of FIG. 1A in accordance with method 200, method 230 and/or method 270.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
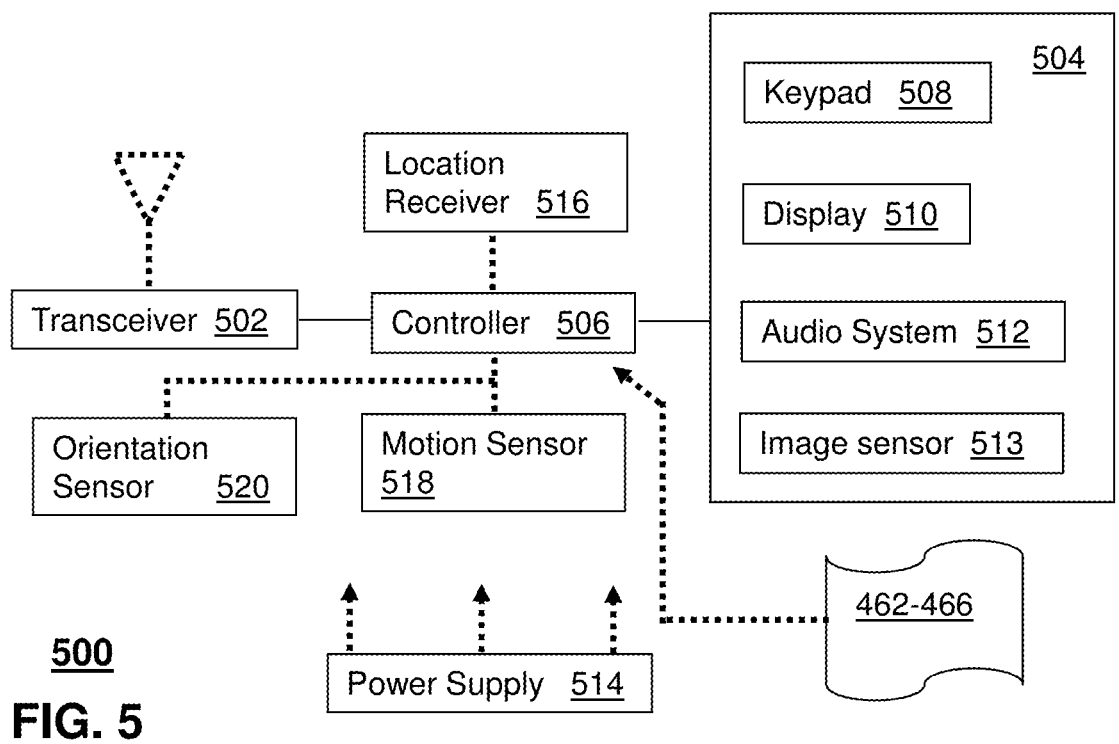
FIG. 5 depicts an illustrative embodiment of a communication device.

FIG. 5 depicts an illustrative embodiment of a communication device 500. Communication device 500 can serve in whole or in part as an illustrative embodiment of the devices depicted in FIGS. 1A, 1B and/or 4 and can be configured to perform portions of (or all of) method 200 of FIG. 2A, method 230 of FIG. 2B and/or method 270 of FIG. 2C.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of devices of FIGS. 1A and/or 1B, the media processor 406, the media devices 408, or the portable communication devices 416 of FIG. 4. It will be appreciated that the communication device 500 can also represent other devices that can operate in systems of FIGS. 1A and/or 1B, and/or communication system 400 of FIG. 4 such as a gaming console and a media player. In addition, the controller 506 can be adapted in various embodiments to perform the functions 462-466.

Upon reviewing the aforementioned embodiments, it would be evident to an artisan with ordinary skill in the art that said embodiments can be modified, reduced, or enhanced without departing from the scope of the claims described below. For example, any desired number of media content servers may communicate with any desired number of set-top boxes. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
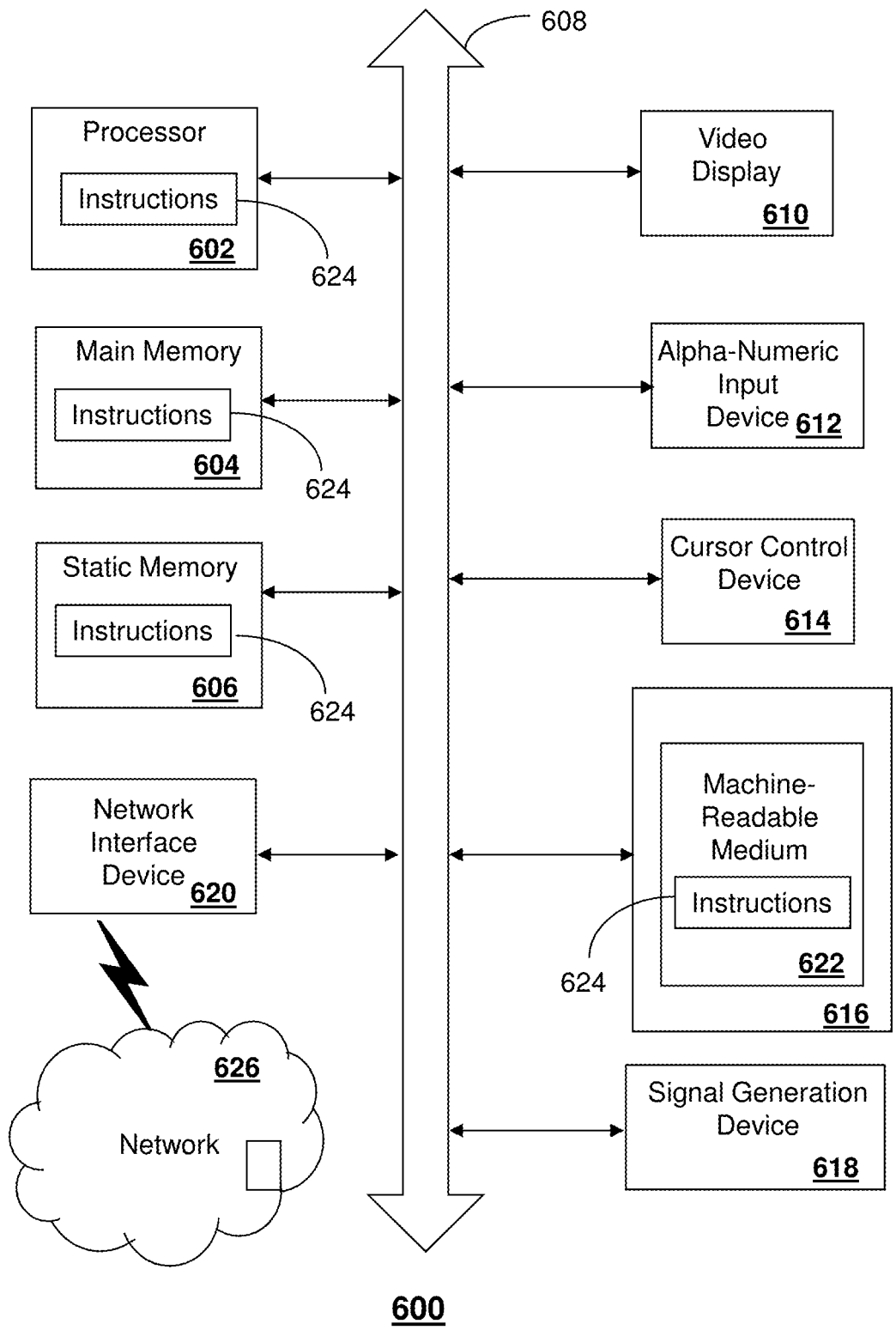
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the service provider server 430 and/or the media processor 406. One or more instances of the machine can operate, for example, as the service provider server 102, the social network server 108, the set-top box 104A, the set-top box 104B, and/or the set-top box 104C of FIG. 1A. One or more instances of the machine can operate, for example, as the master server 152, the media content server 154A, the media content server 154B and/or the media content server 152C of FIG. 1B.

In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable medium comprising executable instructions that, when executed by a processing system including a processor, perform operations, the operations comprising:
   sending, to a first media processing device at a first location, a first media content item for output to a display that is in operative communication with the first media processing device, wherein the output results in a presentation, wherein the first media content item includes an advertisement for a second media content item, and wherein the first media processing device is associated with a first subscriber to a service;
   receiving from an end user device at the first location, during the presentation of the advertisement or during a first time period extending from an end of the advertisement to a threshold period of time that is before an end of the presentation, a recording instruction, wherein a query is presented at the display responsive to the receiving of the recording instruction, wherein the threshold period of time is set by a user to whom the query is presented, and wherein the query provides a first choice to record the first media content item and a second choice to record the second media content item;
   receiving a reply to the query, wherein the reply includes either a first command to record the first media content item or a second command to record the second media content item, wherein the recording instruction further includes an identification of a selected recording device at which recording is to occur, wherein the end user device and the selected recording device are associated with a second subscriber to the service, and wherein the selected recording device is at a second location, different from the first location;
   sending, responsive to receiving the first command, a first recording instruction to the selected recording device to cause the selected recording device to record the first media content item; and
   sending, responsive to receiving the second command, a second recording instruction to the selected recording device to cause the selected recording device to record the second media content item.

2. The non-transitory, machine-readable medium of claim 1, wherein the first recording instruction to the selected recording device to cause the selected recording device to record the first media content item causes one of directing a current recording of the first media content item or directing a scheduling of a future recording of the first media content item, and wherein the second media content item in the advertisement is identified from metadata in the advertisement.

3. The non-transitory, machine-readable medium of claim 2, wherein the second recording instruction to the selected recording device to cause the selected recording device to record the second media content item causes one of directing a current recording of the second media content item or directing a scheduling of a future recording of the second media content item.

4. The non-transitory, machine-readable medium of claim 1, wherein the first media processing device comprises a set-top box,
   wherein the end user device comprises a mobile communication device,
   wherein the selected recording device comprises a digital video recorder,
   wherein the second media content item in the advertisement is identified from a pattern recognition analysis of the advertisement, and
   wherein the pattern recognition analysis is according to audio data, image data, or a combination thereof.

5. The non-transitory, machine-readable medium of claim 4, wherein the mobile communication device comprises a smartphone and the reply to the query is sent by software operating on the smartphone.

6. The non-transitory, machine-readable medium of claim 5, wherein the selected recording device had been selected via a selection made at the smartphone using the software operating on the smartphone.

7. The non-transitory, machine-readable medium of claim 1, wherein the selected recording device comprises one of a first recording device or a second recording device,
   wherein the first recording device is distinct from the second recording device, and
   wherein the first recording device and the second recording device are associated with the second subscriber.

8. A media processing device comprising:
   a processing system including a processor; and
   a memory storing executable instructions that, when executed by the processing system, perform operations comprising:
   providing, to a first media processing device at a first location, a first media content item for output to a display that is in operative communication with the first media processing device, wherein the output results in a presentation, wherein the first media content item includes an advertisement for a second media content item, and wherein the first media processing device is associated with a first subscriber to a service;
   obtaining from an end user device at the first location, during the presentation of the advertisement or during a first time period extending from an end of the advertisement to a threshold period of time that is before an end of the presentation, a recording instruction, wherein a query is presented responsive to the obtaining of the recording instruction, wherein the threshold period of time is set by a user to whom the query is presented, and wherein the query provides a first choice to record the first media content item and a second choice to record the second media content item;
   receiving a recording command to obtain a received recording command, wherein the recording command includes either the first choice to record the first media content item or the second choice to record the second media content item, wherein the recording command further includes an identification of a selected recording device at which recording is to occur, wherein the end user device and the selected recording device are associated with a second subscriber to the service, and wherein the selected recording device is at a second location, different from the first location;

providing, responsive to the received recording command identifying the first choice, a first recording instruction to the selected recording device to cause the selected recording device to record the first media content item; and providing, responsive to the received recording command identifying the second choice, a second recording instruction to the selected recording device to cause the selected recording device to record the second media content item.

9. The media processing device of claim 8, wherein the first recording instruction to the selected recording device to cause the selected recording device to record the first media content item causes one of directing a current recording of the first media content item or directing a scheduling of a future recording of the first media content item, and wherein the second recording instruction to the selected recording device to cause the selected recording device to record the second media content item causes one of directing a current recording of the second media content item or directing a scheduling of a future recording of the second media content item.

10. The media processing device of claim 9, wherein the selected recording device comprises a digital video recorder.

11. The media processing device of claim 8, wherein the first media processing device comprises a set-top box and the end user device comprises a mobile communication device.

12. The media processing device of claim 11, wherein the mobile communication device comprises a smartphone and the recording command is sent by software operating on the smartphone.

13. The media processing device of claim 12, wherein the selected recording device had been selected via a selection made at the smartphone using the software operating on the smartphone.

14. The media processing device of claim 8, wherein the selected recording device comprises one of a first recording device or a second recording device, and wherein the first recording device is distinct from the second recording device.

15. The media processing device of claim 14, wherein the first recording device and the second recording device are associated with the second subscriber.

16. A method, comprising:
providing, by a processing system including a processor, to a first media processing device at a first location, a first media content item for output to a display that is in operative communication with the first media processing device, wherein the output results in a presentation, wherein the first media content item includes an advertisement for a second media content item, and wherein the first media processing device is associated with a first subscriber to a service;

obtaining, by the processing system, from an end user device at the first location, during the presentation of the advertisement or during a first time period extending from an end of the advertisement to a threshold period of time that is before an end of the presentation, a recording instruction, wherein a query is presented at the display responsive to the obtaining of the recording instruction, wherein the threshold period of time is set by a user to whom the query is presented, and wherein the query provides a first choice to record the first media content item and a second choice to record the second media content item;

receiving, by the processing system, a recording command to obtain a received recording command, wherein the recording command includes either the first choice to record the first media content item or the second choice to record the second media content item, wherein the recording command further includes an identification of a selected recording device at which recording is to occur, wherein the end user device and the selected recording device are associated with a second subscriber to the service, and wherein the selected recording device is at a second location, different from the first location;

providing, by the processing system, responsive to the received recording command identifying the first choice, a first recording instruction to the selected recording device to cause the selected recording device to record the first media content item; and providing, by the processing system, responsive to receiving the received recording command identifying the second choice, a second recording instruction to the selected recording device to cause the selected recording device to record the second media content item.

17. The method of claim 16, wherein the first recording instruction to the selected recording device to cause the selected recording device to record the first media content item causes one of directing a current recording of the first media content item or directing a scheduling of a future recording of the first media content item.

18. The method of claim 17, wherein the second recording instruction to the selected recording device to cause the selected recording device to record the second media content item causes one of directing a current recording of the second media content item or directing a scheduling of a future recording of the second media content item.

19. The method of claim 16, wherein the first media processing device comprises a set-top box,
wherein the end user device comprises a mobile communication device, and
wherein the selected recording device comprises a digital video recorder.

20. The method of claim 19, wherein the mobile communication device comprises a smartphone and the recording command is sent by software operating on the smartphone.

* * * * *